Dec. 8, 1964 C. E. DUNNING 3,160,751
OPTICAL SYSTEM FOR IDENTIFYING AND TRACKING
SOURCE OF INFRARED RADIATION EMISSION
Filed June 5, 1961 2 Sheets-Sheet 1

INVENTOR.
CHARLES E. DUNNING
BY
ATTORNEY

Dec. 8, 1964 C. E. DUNNING 3,160,751
OPTICAL SYSTEM FOR IDENTIFYING AND TRACKING
SOURCE OF INFRARED RADIATION EMISSION
Filed June 5, 1961 2 Sheets-Sheet 2

INVENTOR.
CHARLES E. DUNNING

ATTORNEY

United States Patent Office 3,160,751
Patented Dec. 8, 1964

3,160,751
OPTICAL SYSTEM FOR IDENTIFYING AND TRACKING SOURCE OF INFRARED RADIATION EMISSION
Charles E. Dunning, Pasadena, Calif., assignor to Aerojet-General Corporation, Azusa, Calif., a corporation of Ohio
Filed June 5, 1961, Ser. No. 114,729
6 Claims. (Cl. 250—83.3)

This invention relates generally to an optical system and more particularly to a device for identifying and tracking an infrared radiation emitting source.

Tracking devices based on the detection of infrared radiation emitted from the propulsion system of the object being tracked are widely known. Since many natural objects and various kinds of machines also emit infrared radiation (hereinafter referred to as I.R.), the tracking device must be capable of distinguishing between the radiation pattern of the object being tracked from the I.R. background or the radiation source from false targets.

Devices for distinguishing between the object being tracked and the radiant background or I.R. from false targets, depend on the characteristic intensity pattern in the frequency spectrum radiated by the object being tracked. When the object being tracked is a vehicle, such as an aircraft or a missile, and depending on the nature of its power source, the object being tracked will radiate I.R. in such a way that the intensities of two or three of the frequencies in its frequency spectrum will have well-defined and characteristic differences from each other. Consequently, methods of identifying the object being tracked or discriminating between the object and the radiant background involve a comparison of the differences between the intensities of these particular frequencies with those of known objects.

One way the intensity of radiation at these particular frequencies was determined was by providing a separate optical system for each particular frequency. The intensity of the frequencies of interest were compared with each other and if the differences in intensity between these frequencies corresponded with the known differences in intensity in these frequencies in the frequency spectrum of a known object, the object could be identified.

The use of a separate optical system for each frequency is undesirable because the parallel optical systems are bulky and heavy which make them unsuitable for employment in certain kinds of vehicles, such as intercepting rockets or planes. In addition, these parallel optical systems are hard to align so that the image of any object viewed by the optical system is correspondingly positioned in each optical system.

To overcome these difficulties, efforts have been made to utilize only one optical system for identification of the target, but the prior approach employing only one optical system was objectionable because the intensities of the various frequencies were compared or measured sequentially instead of simultaneously. As a result, the characteristic flicker pattern inherent in the target propulsion system introduced a substantial source of error in the analysis of a spectral pattern of the target.

To overcome the above described disadvantages in prior I.R. target identifying systems, it would be desirable to provide a single optical I.R. target identifying system which simultaneously measures and compares the intensity of selected frequencies in the spectrum of the target object for purposes of identification. It would be further desirable to be able to provide a target identifying optical system which can be easily incorporated in any existing I.R. optical tracking system so that a single I.R. optical system can simultaneously compare selected frequencies in the I.R. spectrum of a target object in addition to locating and tracking the object.

The invention in its broadest aspect comprises the use of a filter element to permit selected and separate I.R. frequencies to enter the optical system. A plurality of detectors each corresponding to a separate frequency is provided. A field lens images the entrance aperture of the optical system and the filter element on these detectors so that the various selected frequencies passing through the entrance aperaure are imaged on separate frequency detectors. These frequency detectors convert light intensity to voltage so that the use of appropriate voltage comparing devices permit the spectrum of the target object to be analyzed and the target to be identified.

This and other objects of this invention will become more apparent when read in the light of the accompanying drawing and specification wherein.

Figure 1:
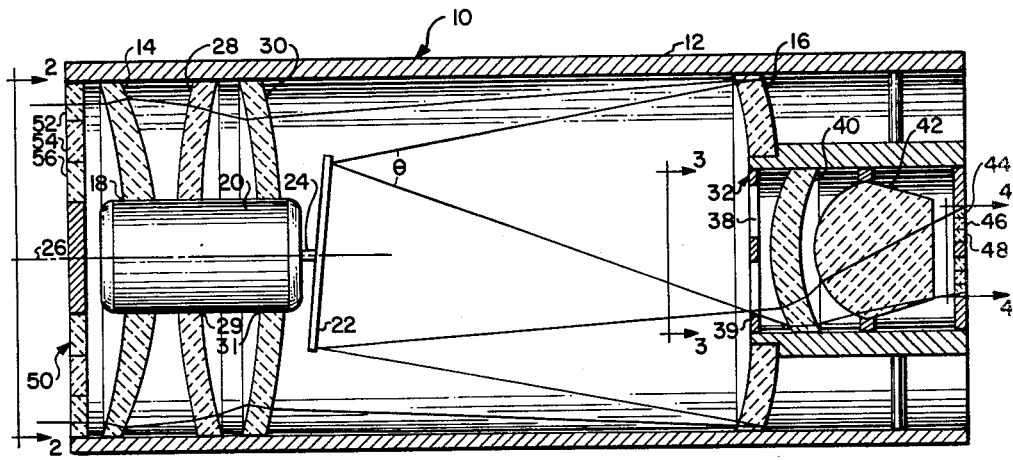
FIG. 1 is a side sectional view of one embodiment of this invention.

Referring now to FIG. 1 of the drawing, an optical system indicated generally by the reference numeral 10 comprises a tubular support member 12. The optical system includes a catadioptric portion comprising an objective lens 14 and a fixed primary mirror 16. The objective lens is provided with a central opening 18 in which a small electric or air-driven motor 20 is mounted. A secondary mirror 22 is mounted on the end of motor shaft 24. In this embodiment, mirror 22 is a simple planner reflective mirror. It is understood, however, that mirror 22 could be shaped to introduce desired corrections into the optical system.

As seen in FIG. 1, the normal to mirror 22 is inclined to the optical axis 26 of the optical system at an angle θ, for reasons to become apparent below. Additional lenses 28 and 30 may be provided to correct for chromatic and other aberrations in the optical system. In addition, lenses 28 and 30 are provided with central openings 29 and 31 giving them an added mechanical function in that they assist objective lens 14 in supporting motor 20. A reticle 32 is mounted in tubular support member 12 at the focal plane of the optical system. With this arrangement, I.R. from the target object entering the optical system through the objective lens 14 comes to a focus on the reticle 32.

The catadioptric optical system described so far can provide a high degree of correction in the I.R. spectrum for all aberrations over a large field of view while at the same time the unit is of relatively short overall length and light weight. This is important when the optical system is designed for use in a vehicle such as an intercepting missile, where size and weight are of prime importance.

When motor 20 is operating, causing mirror 22 to rotate, the I.R. image of an object viewed by the optical system and on the optical axis passes through the objective lens 14 and through the correcting lenses 28 and 30 to the thick primary mirror 16. This radiation is then reflected from the rear surface of mirror 16 onto the surface of the seconday inclined mirror 22. Mirror 22 in turn reflects the radiation onto the recticle 32. The reticle is at the focal plane of the optical system so that the radiant image from the target object is focused thereon.

Figure 3:
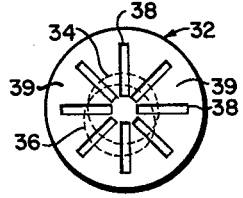
FIG. 3 is a sectional view taken on the line 3—3 of FIG. 1.

The inclination of mirror 22 is such that when mirror 22 rotates the image of an object viewed by the optical system and on the optical axis moves in a circular path 34 concentric with the optical axis (see FIG. 3). If the object viewed by the optical system is off the optical axis its image will still move in a circular path such as 36 but the circular path will no longer be concentric with optical axis 26.

As seen in FIG. 3 the reticle 32 is generally opaque but is provided with uniformly and angularly spaced radially extending radiation transmitting slots 38. Consequently, the image of an object viewed by the optical system and on axis 26 will pass over the radiation transmitting slots 38 and the intermediate opaque portions 39 at equally spaced intervals of time. As a result, I.R. pulses will pass through the reticle at a constant frequency. If, however, the object viewed by the optical system is off the optical axis, its image will move on a path 36 which is not concentric with the axis of the optical system, but which is characteristic of the position of the object with respect to the optical axis 26. Since the image of the object following such a path 36 will not pass over the radiation transmitting slots 38 at equally spaced intervals of time the light pulses passing through the reticle 32 will have a varying frequency which depends on the position of the object with respect to the optical axis.

A field lens comprising lens elements 40 and 42 is positioned to the rear of reticle 32 for the purpose of focusing the image of the entrance aperture of the optical system on a plurality of detectors. In this particular embodiment three detectors, 44, 46, and 48 are provided, but it is understood that the optical system could have more or less, as required.

With this arrangement, each pulse of I.R. passing through the reticle 32 illuminates the image of the entrance aperture of the optical system on the detectors whereby since separate portions of the spectrum in each pulse fall on separate detectors, the frequency of the output voltage from each detector is exactly equal to the frequency variation in the I.R. pulses passing through the reticle. Since the pattern of the frequency variation is characteristic of the position of the object viewed by the optical system with respect to the optical axis, a suitable analyzer can be provided to use this information in guiding the missile or the intercepting vehicle toward the object.

Figure 2:
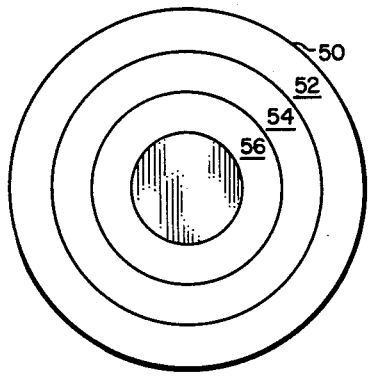
FIG. 2 is an end elevation view taken on the line 2—2 of FIG. 1.

To this point, the optical system described provides a means for tracking the target object but doesn't identify it. In order to identify the object, a filter element indicated generally by the reference numeral 50 is positioned closely adjacent the entrance aperture of the optical system. For the optical system shown in FIG. 1, this requires the filter element to be positioned closely adjacent the objective lens 14. The filter element in this particular embodiment comprises three separate filter portions, 52, 54, and 56. Each filter portion is capable of transmitting only a narrow frequency band width in the I.R. spectrum. As best seen in FIG. 2, the portions 52, 54, and 56 are ring-shaped and concentric with each other and the axis of the optical system. It is to be understood, however, that the concentric arrangement of the bandpass filters disclosed in FIG. 2 is not essential and the bandpass filter portions can have any shape appropriate to the type of optical system used.

The effect of the filter element 50 is to restrict infrared radiation entering the optical system 10 to the three separate narrow frequency bands transmitted through the filter 50. In addition, the filter element 50 cooperates with the other lens elements in the optical system in maintaining the narrow frequency bands separate from each other.

Figure 4:
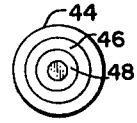
FIG. 4 is a sectional view taken on the line 4—4 of FIG. 1.

As stated above, the image of an object viewed by the optical system is focused on the reticle and is moved along a circular path by the rotation of plane mirror 22. Each pulse of light passing through one of the slots 38 in the reticle 32 illuminates the image of the entrance aperture of the optical system on the detectors 44, 46, and 48. As seen in FIG. 4, the detectors are concentric with each other to conform to the shape of the filter portions 52, 54, and 56 on the filter element 50. The size and position of the detectors 44, 46, and 48 is such that when the image of the filter element 50 and the bandpass filter portions 52, 54, and 56 are projected onto the detectors along with the image of the entrance aperture, each of the separated narrow frequency bands $\lambda_1$, $\lambda_2$, and $\lambda_3$, passing through the filter element 50 falls on only one of the detectors. The detectors 44, 46, and 48 are insulated from each other, and the filter element 50 and bandpass filter portions 52, 54, and 56 may be designed to cooperate with detectors 44, 46, and 48 so that these detectors are equal in sensitivity. With this arrangement, it is apparent that the voltage output from detectors 44, 46, and 48 is proportional to the intensity of the radiation passing through each of the narrow frequency band filters 52, 54, and 56.

It is presumed that the intensity distribution over the I.R. frequency spectrum of the target object is known, and that the differences in intensity between one or more frequencies in the radiated frequency spectrum are characteristic of the class of the target object. Making use of this information, the band pass filters 52, 54, and 56 in filter element 50 are selected to transmit only the narrow frequency bands which have characteristic differences in intensity when the object viewed is in a particular class. In other words each filter element 50 is best suited for the identification of a target object in a given class. Consequently, by knowing the characteristics of the filter element 50 and by comparing the intensity of the voltage output signals from detectors 44, 46, and 48 with the differences in intensities, in particular narrow frequency bands of various classes of target objects, the particular target object viewed by the optical system can be identified.

As stated above, detectors 44, 46, and 48 are insulated from each other so that the optical system can be used to identify the object. If identification is not required, a substitute electrical switching arrangement, not shown, may be provided to connect the detectors 44, 46, and 48 in series with each other to increase the sensitivity of the optical system for tracking purposes.

Figure 5:
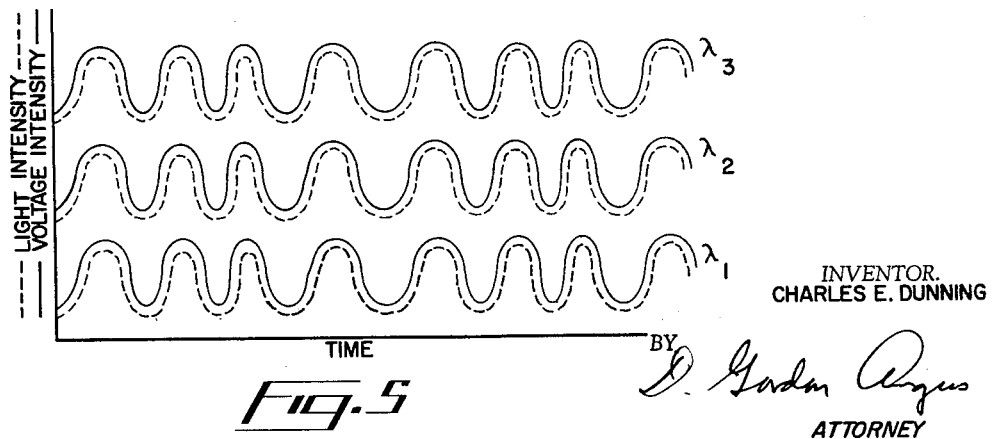
FIG. 5 is a graph showing a typical light intensity pattern of the various detectors and their corresponding voltage outputs.

As seen in FIG. 5 the voltage output from each detector will have the same pattern of frequency variation, which characterizes the position of the target object with respect to the optical system. However, as stated above, the signal voltage output from each detector will vary. For example, as shown in FIG. 5, filter element 50 will transmit three separate narrow frequency bands, $\lambda_1$, $\lambda_2$, and $\lambda_3$. The voltage output from detectors 44, 46, and 48 show that the normalized magnitudes of the intensity of radiation of these frequencies are, by way of example, 1, 3, and 5 respectively. As stated above, this variation in intensity in the frequency bands $\lambda_1$, $\lambda_2$, and $\lambda_3$, is characteristic of one class of target object. Consequently, the object can be identified and this identification can be done automatically through the use of suitable electric circuits not shown. In essence, then, the above described infrared optical system may be designated as a yes/no identifying device because any particular filter element 50 used with this optical system permits the optical system to identify only one or a limited number of different kinds of targets.

If the target object is a missile, a situation might occur where the normal intensity distribution over the infrared frequency spectrum from the object is substantially the same for friendly and unfriendly missiles. To eliminate such a possibility the fuel of friendly missiles could be modified so that they all exhibit an artificially constructed intensity relationship between several selected frequencies in the I.R. frequency spectrum. This would require each filter element to include bandpass filter portions for the artificially selected frequencies and the detectors would have to be modified accordingly.

Figure 6:
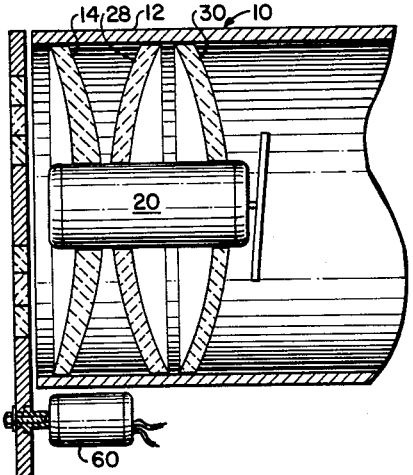
FIG. 6 is a side sectional view of a portion of another embodiment of this invention.
Figure 7:
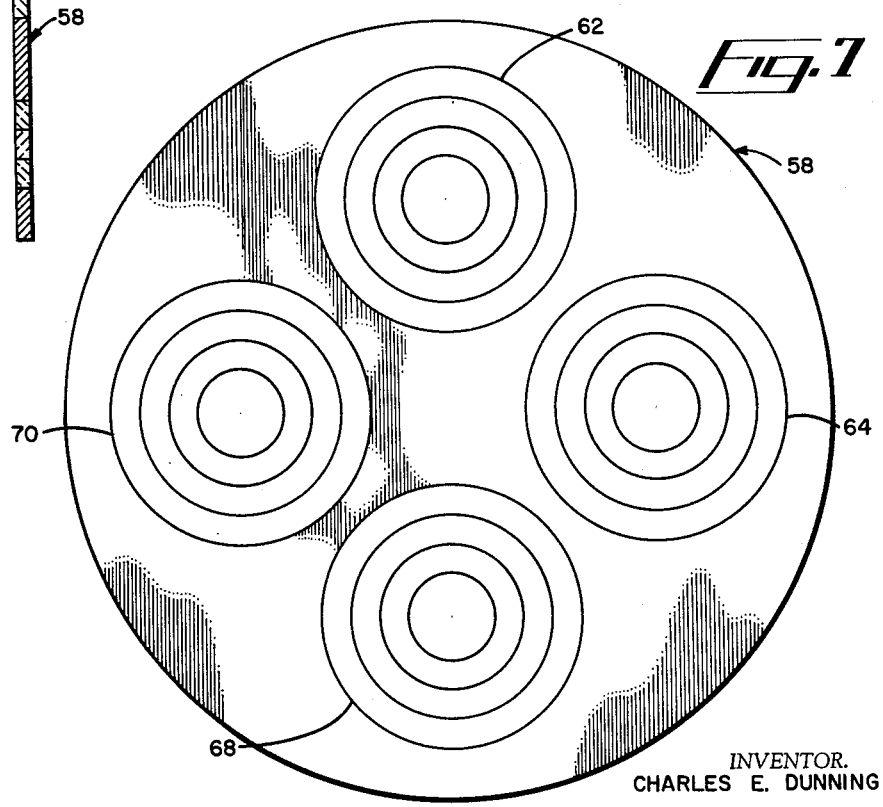
FIG. 7 is a plan view of the filter disk shown in FIG. 6.

As stated above, each filter element 50 can identify one, or at best, only a very limited number of different kinds of target objects. Under some circumstances, it may be necessary to rapidly identify an object from a comparatively large number of different possibilities. The above described target identifying device is readily adaptable for this purpose. As shown in FIG. 6 a disk 58 rotatably driven by an electric motor 60 is associated with the optical system 10. The disk itself is preferably transparent to radiation in the infrared spectrum. However, as shown in FIG. 7, the disk in this embodiment is provided with four filter elements, 62, 64, 68, and 70. Each filter element may be provided with three narrow frequency bandpass portions and as stated above, each filter element is suitable for identifying only one or at best a very limited number of classes of target objects. In use, disk 58 is positioned in front of the optical system 10, as shown in FIG. 6. Motor 60 may drive disk 58 either continuously or on command to sequentially position the filter elements on disk 58 in front of the optical system.

In this way, limited only by the size of disk 58, and the number of filter elements formed thereon, selected combinations of narrow frequency bands in the I.R. spectrum of an object viewed by the optical system sequentially enter the optical system. By this procedure a target object can be identified positively from an indefinitely large number of different kinds of objects. By forming disk 58 so, except for the filter elements, it is completely transparent to radiation in the infrared region, the optical system can continuously track a target object while disk 58 is rotating, and before the target is identified. It is readily apparent that as each filter element on disk 58 moves to a correct position in front of the optical system, appropriate circuitry can be provided to actuate the target identifying circuit.

It is obvious that many modifications of the present invention are posible in the light of the above teachings. It is therefore to be understood that the invention may be practiced other than as described and still remain in the scope of the appended claims.

I claim:

1. In an infrared optical system, a filter element at least closely adjacent the entrance aperture of the optical system, said filter element having a plurality of separate portions, each portion capable of transmitting substantially a single narrow frequency band, said portions of the filter element separating the narrow frequency bands from each other in the optical system, a plurality of I.R. detectors, and a field lens for imaging the entrance aperture and the filter element on the detectors, said detectors positioned so each of the selected frequency bands entering the optical systems fall on only one detector whreby the differences in the intensities of the selected frequency bands can be compared with each other and with the known I.R. characteristics of various targets for purposes of identification.

2. An infrared optical system comprising in combination a filter element positioned so all radiation entering into the optical system must pass through the filter element, said filter element at least closely adjacent the entrance aperture of the optical system and having a plurality of separate portions, each portion capable of transmitting a single frequency band whereby only the frequency bands transmitted by said separate portions can enter the optical system, said portions of the filter element separating narrow frequency bands from each other in the optical system, a plurality of I.R. detectors, said detectors electrically insulated from each other, and a field lens, said field lens and said detectors positioned so the field lens images the entrance aperture and the filter elements on the detectors and so each of the selected frequency bands entering the optical system falls on only one detector whereby the differences in the intensities of the selected frequency bands can be compared with each other and with the known I.R. characteristics of various targets for purposes of identification, and means in said optical system, including at least one of said detectors, for determining the position of the target with respect to the optical system.

3. The infrared optical system described in claim 2 wherein said means for determining the position of the target with respect to the optical system includes a reticle and an image moving device for causing the image of the object to move in a predetermined path on the reticle, the position of said path on the reticle dependent on the position of the target with respect to the optical system, means on said reticle for converting the path of said image to light pulses passing through the reticle, the frequency variations of said light pulses dependent on the position of the target with respect to the optical system whereby when said light pulses fall on at least one of said detectors the frequency variation in the voltage output of the detectors can be analyzed to determined the location of the object.

4. An infrared optical system for sequentially examining a series of selected combinations of narrow frequency bands in the I.R. spectrum of an object viewed by the optical system for purposes of identification comprising a rotatably mounted disk, said disk including a plurality of filter elements, each filter element having a plurality of separate portions, each portion capable of transmitting only a single narrow frequency band, said disk positioned at least closely adjacent the entrance aperture of the optical system so that all radiation entering the optical system must pass through the disk, means for rotating said disk so each filter element is sequentially aligned with the optical system whereby selected combinations of narrow frequency bands in the I.R. spectrum of an object viewed by the optical system sequentially enter the optical system, said portions of the filter element aligned with the optical system separating the narrow frequency bands in the optical system from each other, a plurality of I.R. detectors, said detectors electrically insulated from each other, and a field lens, said field lens and said detectors positioned so the field lens images the entrance aperture of the optical system and the filter elements on the disk as they become aligned with the optical system onto the detectors, with each frequency band entering the optical system falling on only one detector whereby the differences in the intensity of the narrow frequency bands in each combination penetrating the optical system can be compared with each other and with the known I.R. intensity frequency characteristics in the spectrum of various targets for purposes of identification and means in said optical system including at least one of said detectors for determining the position of the target with respect to the optical system.

5. The infrared optical system described in claim 4 wherein said means for determining the position of the target with respect to the optical system includes a reticle and an image moving object for causing the image of the object to move in a predetermined path on the reticle, the position of said path on the reticle dependent on the position of the target with respect to the optical system, means on said reticle for converting the path of said image to light pulses passing through the reticle, the frequency variations of said light pulses dependent on the position of the target with respect to the optical system whereby when said light pulses fall on at least one of said detectors the frequency variation in the voltage output of the detectors can be analyzed to determine the location of the object.

6. The infrared optical system described in claim 5 wherein said disk except for said filter elements is transparent to I.R. radiation so that the optical system can continuously track any object viewed by the optical system while the disk is rotating and before the target has been identified.

References Cited in the file of this patent
UNITED STATES PATENTS

| | | |
|---|---|---|
| 2,422,971 | Kell et al. | June 24, 1947 |
| 2,848,626 | Brackmann | Aug. 19, 1958 |
| 2,931,911 | Nichols | Apr. 5, 1960 |
| 2,981,843 | Hansen | Apr. 25, 1961 |